United States Patent Office 3,205,169
Patented Sept. 7, 1965

3,205,169
COMPOSITIONS FOR BREAKING EMULSIONS OR INHIBITING FORMATION THEREOF AND PROCESSES UTILIZING SAME
Willard H. Kirkpatrick, Sugar Land, and Virgil L. Seale and Richard E. Berkley, Houston, Tex., assignors to Nalco Chemical Company, a corporation of Delaware
No Drawing. Filed July 14, 1961, Ser. No. 123,989
16 Claims. (Cl. 252—8.55)

This invention, in general, relates to quaternary ammonium salts and to new surface-active compositions and uses thereof. These compositions are active in the breakng of or in inhibiting the formation of water and oil emulsions. They also are useful as additives for acidizing solutions used to acidize subterranean formations.

Briefly, the compositions of the invention are a combination of (1) a quaternary ammonium salt of a tertiary amine of the formula

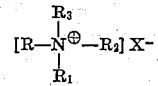

wherein R is a member from the group consisting of alkyl and alkenyl having 12–18 carbons, $R_1$ is selected from the group consisting of 2-hydroxyethyl and 2-hydroxypropyl, $R_2$ is selected from the group consisting of 2-hydroxyethyl and 2-hydroxypropyl, $R_3$ is selected from the group consisting of benzyl, lower alkyl, lower alkyl halide, lower alkenyl and lower alkenyl halide, and $X^-$ is an anion, and a small fraction in relation to said quaternary salt, e.g., about 1–30%, preferably 3–30%, by weight based on said quaternary salt, of (2) an organic polyelectrolyte selected from the group consisting of a condensation product of a member selected from the group consisting of a 2–4 carbon alkylene dihalide, epichlorohydrin and epibromohydrin, an alkylene polyamine having 2–6 carbons per alkylene group and 2–5 amino groups, and a 12–18 carbon aliphatic monoamine condensed at a mol ratio of 0.6–1.2 mols of said member and 0.2–2 mols of said aliphatic monoamine per each mol of said alkylene polyamine.

The polyelectrolyte condensation product is believed to comprise a substantially linear chain of alternating nuclei of the amines and the alkylene dihalide, epichlorohydrin or epibromohydrin with ionized or charged groups at the amino nitrogens. The monoamines are terminal groups, and the relative amount of the monoamine in the condensation reaction mixture has a direct bearing on the degree of condensation. As the molar proportion of the monoamine to the alkylene polyamine increases, the degree of condensation, i.e., the number of condensed units in the average molecule, decreases. Increasing the molar proportion of the alkylene polyamine with reference to the monoamine, on the other hand, increases the number of condensed units per average molecule.

The condensation is conducted at temperatures in the range of about 110–190° C., preferably by adding alkylene dihalide, epichlorohydrin or epibromohydrin to a mixture of the amines. The reaction time is about ½ hour to about 8 hours. In some cases, especially with epichlorohydrin, the reaction is best conducted in less than about 2–3 hours.

The aliphatic monoamines for the condensation products may be 12–18 carbon alkylmonoamines and/or 12–18 carbon alkenylmonoamines, e.g., laurylamine, palmitylamine, stearylamine, oleylamine, linoleylamine, etc., or mixtures such as soy amine, coco amine and the like wherein the amines are derived from fatty acid mixtures obtained from various fats such as soybean oil, cottonseed oil, coconut oil, etc.

The alkylene polyamines preferably have the formula

wherein R represent an alkylene group such as ethylene, 1,2-propylene, butylene, hexamethylene and the like. Examples thereof include ethylene diamine, diethylene triamine, triethylene tetramine, tetraethylene pentamine, propylene diamine, dipropylene triamine, tripropylene tetramine, corresponding butylene diamines and polyamines, hexamethylene diamine, bis-hexamethylene triamine, tris-hexamethylene tetramine and the like.

The alkylene dihalides are 2–4 carbon halides such as ethylene dichloride-1,2; ethylene dibromide, 1,2; propylene dichloride-1,2; propylene dibromide-1,2; propylene dichloride-1,3; propylene dibromide-1,3; butylene dichloride-1,4; butylene dibromide-1,4; butylene dichloride-1,3; and butylene dibromide-1,3.

The other essential ingredient of the compositions of the invention is the quaternary salt of the tertiary amine. These amines have the general formula

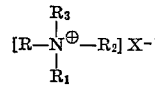

wherein R is 12–18 carbon alkyl or 12–18 carbon alkenyl, $R_1$ is 2-hydroxyethyl or 2-hydroxypropyl; $R_2$ is 2-hydroxyethyl or 2-hydroxypropyl; $R_3$ is the nucleus of quaternizing agent, i.e., benzyl, lower alkyl (1–6 carbon alkyl), lower alkyl halide (e.g., 2–6 carbon chloroalkyl), lower alkenyl (2–6 carbon alkenyl) or lower alkenyl halide (e.g., 2–6 carbon chloroalkenyl); and X is the anion of the quaternizing compound such as halogen, e.g., a chloride or bromide ion, $CH_3SO_4^-$ from methyl sulfate, $CH_3CH_2SO_4^-$ from ethyl sulfate, and the like.

The following examples serve to illustrate various tertiary amines and condensation products used to formulate the surface-active compositions of the invention, as well as formulations of said surface-active compositions. The parts are by weight unless indicated otherwise.

EXAMPLE I

An oxyalkylation vessel was charged with 319 parts of oleyl amine. Then 133 parts of ethylene oxide was charged into the vessel over a period of 4 hours at 150–160° C. and 20–80 p.s.i.g. to obtain N,N-dihydroxyethyl oleyl amine.

EXAMPLE II

An oxyalkylation vessel was charged with 326 parts of oleyl amine. Then, 172 parts of propylene oxide-1,2 was charged into the vessel over a period of about four hours at 150–170° C. and 20–80 p.s.i.g. to obtain N,N-di-(2-hydroxypropyl) oleyl amine.

EXAMPLE III

The procedure of Example I was repeated with 375 parts of coco amine (derived from a coconut oil fatty acid mixture) and 198 parts of ethylene oxide to obtain N,N-dihydroxyethyl coco amine.

EXAMPLE IV

The procedure of Example II was repeated with 382 parts of coco amine and 260 parts of propylene oxide-1,2 to obtain N,N-di-(2-hydroxypropyl) coco amine.

EXAMPLE V

The procedure of Example I was repeated with 378 parts of cottonseed oil amine (derived from a cottonseed oil fatty acid mixture) and 159 parts of ethylene oxide to obtain N,N-dihydroxyethyl cottonseed oil amine.

EXAMPLE VI

The procedure of Example II was repeated with 388 parts of cottonseed oil amine and 208 parts of propylene oxide-1,2 to obtain N,N-di-(2-hydroxypropyl) cottonseed oil amine.

EXAMPLE VII

The procedure of Example I was repeated with 383 parts of soy amine (derived from a soybean oil fatty acid mixture) and 160 parts of ethylene oxide to obtain N,N-dihydroxyethyl soy amine.

EXAMPLE VIII

The procedure of Example II was repeated with 385 parts of soy amine and 206 parts of propylene oxide-1,2 to obtain N,N-di-(2-hydroxypropyl) soy amine.

EXAMPLES IX–XVI

Quaternary salts of the foregoing N,N-dihydroxyalkyl tertiary amines were produced by the reaction for six hours of benzyl chloride and the amines in the following proportions and under the following conditions:

| Ex. | Tertiary amine | | Pts. Benzyl Chloride | Temperature, ° C. |
|---|---|---|---|---|
| | Ex. | Parts | | |
| IX | I | 168 | 63 | 80–120 |
| X | II | 182 | 63 | 80–100 |
| XI | III | 136 | 63 | 80–105 |
| XII | IV | 150 | 63 | 80–105 |
| XIII | V | 164 | 63 | 80–105 |
| XIV | VI | 178 | 63 | 80–120 |
| XV | VII | 164 | 63 | 80–110 |
| XVI | VIII | 178 | 63 | 80–125 |

EXAMPLES XVII–XXIV

One hundred parts of the quaternary ammonium salts of the preceding examples were formulated in aqueous or aqueous alcoholic solvent systems as follows:

| Example | Quat. Salt | Solvent |
|---|---|---|
| XVII | Ex. IX | 220 parts water. |
| XVIII | Ex. X | 151 parts water, 151 parts isopropanol. |
| XIX | Ex. XI | 292 parts water. |
| XX | Ex. XII | 128 parts isopropanol, 299 parts water. |
| XXI | Ex. XIII | 39 parts isopropanol, 240 parts water. |
| XXII | Ex. XIV | 111 parts isopropanol, 202 parts water. |
| XXIII | Ex. XV | 277 parts water, 39 parts isopropanol. |
| XXIV | Ex. XVI | 244 parts water, 138 parts isopropanol. |

The following are examples of polyelectrolytes used in the practice of the invention

EXAMPLE XXV

To a charge in a reaction vessel of 240 parts soy amine and 65.5 parts of dipropylene triamine, heated to 130° C., was slowly added 70 parts of ethylene dichloride-1,2 while maintaining the temperature between 130° C. and 150° C. The temperature was then raised to 180° C. to complete the reaction. After the reaction product was cooled to 100° C., 1083 parts of water and 464 parts of methanol were added to yield the finished product of the fatty monoamine-dipropylene triamine-ethylene dichloride condensate in the water-methanol solvent system.

EXAMPLE XXVI

To a charge in a reaction vessel of 240 parts soy amine and 131 parts of dipropylene triamine, heated to 130° C., was slowly added 104 parts of ethylene dichloride-1,2 while maintaining the temperature between 130° C. and 150° C. The temperature was then raised to 180° C. to complete the reaction. After the reaction product was cooled to 100° C., 1240 parts of water and 531 parts of methanol were added to yield the finished product of the fatty monoamine-dipropylene triamine-ethylene dichloride condensate in the water-methanol solvent system.

EXAMPLE XXVII

To a charge in a reaction vessel of 120 parts soy amine and 131 parts of dipropylene triamine, heated to 130° C., was slowly added 86.7 parts of ethylene dichloride-1,2 while maintaining the temperature between 130° C. and 150° C. The temperature was then raised to 160° C. to complete the reaction. After the reaction product was cooled to 100° C., 776 parts of water and 333 parts of methanol were added to yield the finished product of the fatty monoamine-dipropylene triamine-ethylene dichloride condensate in the water-methanol solvent system.

EXAMPLE XXVIII

To a charge in a reaction vessel of 120 parts soy amine and 229 parts of dipropylene triamine, heated to 130° C., was slowly added 138.6 parts of ethylene dichloride-1,2 while maintaining the temperature between 130° C. and 150° C. The temperature was then raised to 160° C. to complete the reaction. After the reaction product was cooled to 100° C., 1014 parts of water and 435 parts of methanol were added to yield the finished product of the fatty monoamine-dipropylene triamine-ethylene dichloride condensate in the water-methanol solvent system.

EXAMPLE XXIX

To a charge in a reaction vessel of 60 parts soy amine and 229 parts of dipropylene triamine, heated to 130° C., was slowly added 130 parts of ethylene dichloride-1,2 while maintaining the temperature between 130° C. and 150° C. The temperature was then raised to 160° C. to complete the reaction. After the reaction product was cooled to 100° C., 791 parts of water and 339 parts of methanol were added to yield the finished product of the fatty monoamine-dipropylene triamine-ethylene dichloride condensate in the water-methanol solvent system.

EXAMPLE XXX

To a charge in a reaction vessel of 240 parts cottonseed oil amine and 65.5 parts of dipropylene triamine, heated to 130° C., was slowly added 70 parts of ethylene dichloride-1,2 while maintaining the temperature between 130° C. and 150° C. The temperature was then raised to 160° C. to complete the reaction. After the reaction product was cooled to 100° C., 688 parts of water and 688 parts of methanol were added to yield the finished product of the fatty monoamine-dipropylene triamine-ethylene dichloride condensate in the water-methanol solvent system.

EXAMPLE XXXI

To a charge in a reaction vessel of 60 parts soy amine and 229 parts of dipropylene triamine, heated to 130° C., was slowly added 130 parts of ethylene dichloride-1,2 while maintaining the temperature between 130° C. and 150° C. The temperature was then raised to 160° C. to complete the reaction. After the reaction product was cooled to 100° C., 548 parts of water and 547 parts of methanol were added to yield the finished product of the fatty monoamine-dipropylene triamine-ethylene dichloride condensate in the water-methanol solvent system.

EXAMPLE XXXII

Two hundred seventy-four parts of N,N-dihydroxyethyl coco amine and 126 parts of benzyl chloride were heated at 135° C. for 7 hours. Upon cooling, the quaternary salt was blended with 790 parts water and 338 parts methanol.

EXAMPLE XXXIII

To a charge in a reaction vessel of 120 parts oleyl amine and 229 parts of dipropylene triamine, heated to 130° C., was slowly added 138.6 parts of ethylene dichloride-1,2 while maintaining the temperature between 130° C. and 150° C. The temperature was then raised to 160° C. to complete the reaction. After the reaction product was cooled to 100° C., 650 parts of water and 650 parts of methanol were added to yield the finished product of the fatty monoamine-dipropylene triamine-ethylene dichloride condensate in the water-methanol solvent system.

EXAMPLE XXXIV

One hundred twenty parts of oleyl amine and 229 parts of dipropylene triamine are heated to 60° C., and 129 parts of epichlorohydrin are added in small increments over a period of two hours at 60–120° C. The temperature of the reaction mixture was then raised to 130° C., and thereafter the mixture was cooled to 110° C., at which point the condensate was blended with 810 parts water and 810 parts methanol.

The compositions of the invention were evaluated as acidizing emulsion additives by emulsifying 50 cc. of a crude oil and 50 cc. of 15% HCl solution containing 0.6% of a composition of the invention, based on the volume of the aqueous HCl solution. The water separation was observed in terms of volume percent at the two-minute and ten-minute intervals. In the spent acid test, the HCl was neutralized with oyster shells, and the neutralized aqueous solution was combined with 0.6% by volume of compositions of the invention. The neutralized aqueous solution was then mixed with a high speed stirrer with an equal volume of crude oil, and the water separation was observed and recorded as volume percent.

The tests are reported in the following table with the following blends which are exemplary compositions of the invention:

Composition A—9 vols. of Example XIX and 1 vol. of Example XXX
Composition B—9 vols. of Example XIX and 1 vol. of Example XXV
Composition C—9 vols. of Example XIX and 1 vol. of Example XXVI
Composition D—9 vols. of Example XIX and 1 vol. of Example XXVIII
Composition E—9 vols. of Example XIX and 1 vol. of Example XXIX
Composition F—9 parts by weight of Example XXXII and 1 part of Example XXXI
Composition G—9 parts by weight of Example XXXII and 1 part of Example XXXIV Table

| Comp. | Crude Oil | Percent Water Drop | | |
|---|---|---|---|---|
| | | 2 min. | 10 min. | Spent Acid |
| Blank | No. 1 | 32 | 32 | 11 |
| A | | 39 | 94 | 92 |
| B | | 28 | 96 | 36 |
| C | | 11 | 94 | 91 |
| D | | 16 | 90 | 95 |
| E | | 19 | 95 | 86 |
| Blank | No. 2 | 0 | 10 | 32 |
| A | | 13 | 96 | 83 |
| B | | 13 | 96 | 45 |
| C | | 14 | 86 | 41 |
| D | | 10 | 90 | 62 |
| E | | 14 | 93 | 79 |
| Blank | No. 3 | 0 | 17 | 43 |
| A | | 22 | 99 | 88 |
| B | | 22 | 98 | 88 |
| C | | 88 | 99 | 85 |
| D | | 89 | 97 | 90 |
| E | | 90 | 99 | 69 |
| Blank | No. 4 | 0 | 0 | 34 |
| A | | 91 | 91 | 92 |
| B | | 84 | 91 | 93 |
| C | | 83 | 92 | 91 |
| D | | 84 | 95 | 89 |
| E | | 78 | 85 | 95 |
| Blank | No. 5 | 40 | 40 | 88 |
| A | | 89 | 98 | 100 |
| B | | 89 | 98 | 100 |
| C | | 83 | 98 | 100 |
| D | | 80 | 89 | 100 |
| E | | 80 | 91 | 100 |

When using the compositions of the invention in the breaking of water-in-petroleum oil emulsions, they are mixed with the emulsion in a ratio of approximately one part of the deemulsifying composition to 2000–50,000 parts of the emulsion. The treating temperature may range from about 50° F. up to about 180° F. Elevated temperatures are often advantageous in obtaining a more rapid or cleaner separation of the oil and water phases while the emulsion stands in a quiescent state after treatment.

In the case of emulsion-inhibition in the treatment of a formation with aqueous HCl (e.g., 10–25% HCl by weight), the compositions are employed advantageously at a weight concentration of the quaternary salt plus condensation product in the aqueous HCl of about 500–1500 p.p.m.

Having described the generic invention and the specific, illustrative embodiments thereof, the invention is claimed as follows:

1. A surface active composition having emulsion-breaking and emulsion-inhibiting properties consisting essentially of a quaternary salt of a tertiary amine of the formula

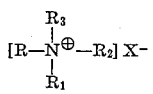

wherein R is a member from the group consisting of alkyl and alkenyl having 12–18 carbons, $R_1$ is selected from the group consisting of 2-hydroxyethyl and 2-hydroxypropyl, $R_2$ is selected from the group consisting of 2-hydroxyethyl and 2-hydroxypropyl, $R_3$ is selected from the group consisting of benzyl, lower alkyl, lower alkyl halide, lower alkenyl and lower alkenyl halide, and X⁻ is an anion and 3–30% by weight in relation to said quaternary salt of an organic polyelectrolyte selected from the group consisting of a condensation product of a member selected from the group consisting of a 2–4 carbon alkylene dihalide, epichlorohydrin and epibromohydrin, an alkylene polyamine having 2–6 carbons per alkylene group and 2–5 amino groups, and a 12–18 carbon aliphatic monoamine condensed at a mol ratio of 0.6–1.2 mols of said member and 0.2–2 mols of said aliphatic monoamine per each mol of said alkylene polyamine.

2. A surface active composition having emulsion-breaking and emulsion-inhibiting properties consisting essentially of a quaternary salt of a tertiary amine of the formula

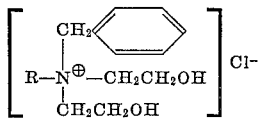

wherein R is selected from the group consisting of alkyl and alkenyl of 12–18 carbons and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

3. A surface active composition having emulsion-breaking and emulsion-inhibiting properties consisting essentially of a quaternary salt of a tertiary amine of the formula

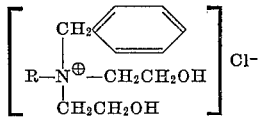

wherein R is selected from the group consisting of alkyl and alkenyl of 12–18 carbons and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

4. A surface active composition having emulsion-breaking and emulsion-inhibiting properties consisting essentially of a quaternary salt of a tertiary amine of the formula

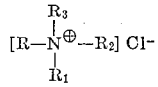

wherein R is a member from the group consisting of alkyl and alkenyl of 12–18 carbons, $R_1$ is selected from the group consisting of 2-hydroxyethyl and 2-hydroxypropyl, $R_2$ is selected from the group consisting of 2-hydroxyethyl and 2-hydroxypropyl and $R_3$ is lower alkyl and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

5. A surface active composition having emulsion-breaking and emulsion-inhibiting properties consisting essentially of a quaternary salt of a tertiary amine of the formula

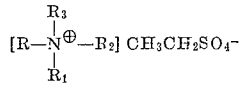

wherein R is a member from the group consisting of alkyl and alkenyl of 12–18 carbons, $R_1$ is selected from the group consisting of 2-hydroxyethyl and 2-hydroxypropyl, $R_2$ is selected from the group consisting of 2-hydroxyethyl and 2-hydroxypropyl and $R_3$ is lower alkyl and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

6. An acidizing solution consisting essentially of an aqueous solution of 10–25% HCl containing as an emulsion-inhibiting composition a mixture consisting essentially of a quaternary salt of a tertiary amine of the formula

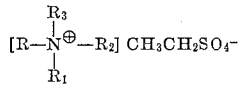

wherein R is a member from the group consisting of alkyl and alkenyl having 12–18 carbons, $R_1$ is selected from the group consisting of 2-hydroxyethyl and 2-hydroxypropyl, $R_2$ is selected from the group consisting of 2-hydroxyethyl and 2-hydroxypropyl, $R_3$ is selected from the group consisting of benzyl, lower alkyl, lower alkyl halide, lower alkenyl and lower alkenyl halide, and $X^-$ is an anion and 3–30% by weight in relation to said quaternary salt of an organic polyelectrolyte selected from the group consisting of a condensation product of a first member selected from the group consisting of a 2–4 carbon alkylene dihalide, epichlorohydrin and epibromohydrin, an alkylene polyamine having 2–6 carbons per alkylene group and 2–5 amino groups, and a second member from the group consisting of a 12–18 carbon alkylmonoamine and a 12–18 carbon alkenylmonoamine condensed at a mol ratio of 0.6–1.2 mols of said first member and 0.2–2 mols of said second member per each mol of said alkylene polyamine.

7. An acidizing solution consisting essentially of an aqueous solution of 10–25% HCl containing as an emulsion-inhibiting composition a mixture consisting essentially of a quaternary salt of a tertiary amine of the formula

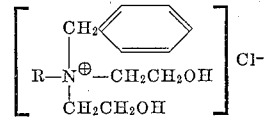

wherein R is selected from the group consisting of alkyl and alkenyl of 12–18 carbons and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine condensed at a mol ratio of 0.6–1.2 mols of ethylene dichloride and 0.2–2 mols of said aliphatic monoamine per each mol of dipropylene triamine.

8. An acidizing solution consisting essentially of an aqueous solution of 10–25% HCl containing as an emulsion-inhibiting composition a mixture consisting essentially of a quaternary salt of a tertiary amine of the formula

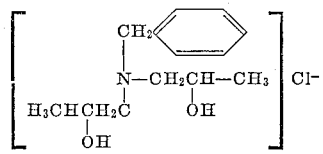

wherein R is selected from the group consisting or alkyl and alkenyl of 12–18 carbons and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

9. An acidizing solution consisting essentially of an aqueous solution of 10–25% HCl containing as an emulsion-inhibiting composition a mixture consisting essentially of a quaternary salt of a tertiary amine of the formula

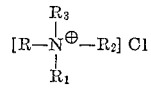

wherein R is a member from the group consisting of alkyl and alkenyl of 12-18 carbons, $R_1$ is selected from the group consisting of 2-hydroxyethyl and 2-hydropropyl, $R_2$ is selected from the group consisting of 2-hydroxyethyl and 2-hydroxypropyl and $R_3$ is a lower alkyl and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

10. An acidizing solution consisting essentially of an aqueous solution of 10–25% HCl containing as an emulsion-inhibiting composition a mixture consisting essentially of a quaternary salt of a tertiary amine of the formula

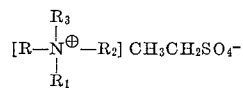

wherein R is a member from the group consisting of alkyl and alkenyl of 12–18 carbons, $R_1$ is selected from the group consisting of 2-hydroxyethyl and 2-hydroxypropyl, $R_2$ is selected from the group consisting of 2-hydroxyethyl and 2-hydroxypropyl and $R_3$ is lower alkyl and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

11. A process for resolving a water-in-petroleum oil emulsion which comprises treating said emulsion with an emulsion-breaking quantity of a mixture comprising a quaternary salt of a tertiary amine of the formula

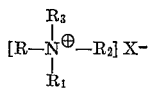

wherein R is a member from the group consisting of alkyl and alkenyl having 12–18 carbons, $R_1$ is selected from the group consisting of 2-hydroxyethyl and 2-hydroxypropyl, $R_2$ is selected from the group consisting of 2-hydroxyethyl and 2-hydroxypropyl, $R_3$ is selected from the group consisting of benzyl, lower alkyl, lower alkyl halide, lower alkenyl and lower alkenyl halide, and $X^-$ is an anion and 3–30% by weight in relation to said quaternary salt of an organic polyelectrolyte selected from the group consisting of a condensation product of a first member selected from the group consisting of a 2–4 carbon alkylene dihalide, epichlorohydrin and epibromohydrin, an alkylene polyamine having 2–6 carbons per alkylene group and 2–5 amino groups, and a second member from the group consisting of a 12–18 carbon alkylmonoamine and a 12–18 carbon alkenylmonoamine condensed at a mol ratio of 0.6–1.2 mols of said first member and 0.2–2 mols of said second member per each mol of said alkylene polyamine.

12. A process for increasing the permeability of an oil-bearing formation which comprises contacting said formation with an acidizing solution comprising an aqueous solution of 10–25% HCl containing as an emulsion-inhibiting composition a mixture of a quaternary salt of a tertiary amine of the formula

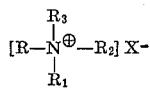

wherein R is a member from the group consisting of alkyl and alkenyl having 12–18 carbons, $R_1$ is selected from the group consisting of 2-hydroxyethyl and 2-hydroxypropyl, $R_2$ is selected from the group consisting of 2-hydroxyethyl and 2-hydroxypropyl, $R_3$ is selected from the group consisting of benzyl, lower alkyl, lower alkyl halide, lower alkenyl and lower alkenyl halide, and $X^-$ is an anion and 3–30% by weight in relation to said quaternary salt of an organic polyelectrolyte selected from the group consisting of a condensation product of a first member selected from the group consisting of a 2–4 carbon alkylene dihalide, epichlorohydrin and epibromohydrin, alkylene polyamine having 2–6 carbons per alkylene group and 2–5 amino groups, and a second member from the group consisting of a 12–18 carbon alkylmonoamine and a 12–18 carbon alkenylmonoamine condensed at a mol ratio of 0.6–1.2 mols of said first member and 0.2–2 mols of said second member per each mol of said alkylene polyamine.

13. A process for resolving a water-in-petroleum oil emulsion which comprises treating said emulsion with an emulsion-breaking quantity of a mixture comprising a quaternary salt of a tertiary amine of the formula

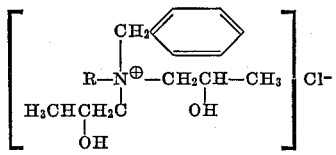

wherein R is selected from the group consisting of alkyl and alkenyl of 12–18 carbons and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

14. A process for resolving a water-in-petroleum oil emulsion which comprises treating said emulsion with an emulsion-breaking quantity of a mixture comprising a quaternary salt of a tertiary amine of the formula

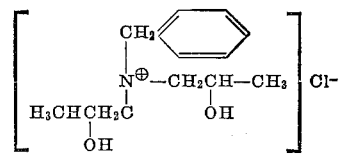

wherein R is selected from the group consisting of alkyl and alkenyl of 12–18 carbons and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

15. A process for resolving a water-in-petroleum oil emulsion which comprises treating said emulsion with an emulsion-breaking quantity of a mixture comprising a quaternary salt of a tertiary amine of the formula

wherein R is a member from the group consisting of alkyl and alkenyl of 12–18 carbons, $R_1$ is selected from the group consisting of 2-hydroxyethyl and 2-hydroxypropyl, $R_2$ is selected from the group consisting of 2-hydroxyethyl and 2-hydroxypropyl and $R_3$ is lower alkyl and 3–30% by weight, based on said quaternary salt, of an organic polyelectrolyte condensation product of ethylene dichloride, dipropylene triamine and a 12–18 carbon aliphatic monoamine condensed at a mol ratio of 0.6–1.2 mols of ethylene dichloride and 0.2–2 mols of said aliphatic monoamine per each mol of dipropylene triamine.

16. A process for resolving a water-in-petroleum oil emulsion which comprises treating said emulsion with an emulsion-breaking quantity of a mixture comprising a quaternary salt of a tertiary amine of the formula

wherein R is a member from the group consisting of alkyl and alkenyl of 12–18 carbons, $R_1$ is selected from the group consisting of 2-hydroxyethyl and 2-hydroxypropyl, $R_2$ is selected from the group consisting of 2-hydroxyethyl and 2-hydroxypropyl and $R_3$ is lower alkyl and 3–30% by weight, based on said quaternary salt, of an organic polyelectrolyte condensation product of ethylene dichloride, dipropylene triamine and a 12–18 carbon aliphatic monoamine condensed at a mole ratio of 0.6–1.2 mols of ethylene dichloride and 0.2–2 mols of said aliphatic monoamine per each mol of dipropylene triamine.

References Cited by the Examiner

UNITED STATES PATENTS

| | | | |
|---|---|---|---|
| 2,003,960 | 6/35 | Tonkin et al. | 260—567.6 |
| 2,050,924 | 8/36 | De Groote | 252—344 |
| 2,108,765 | 2/38 | Domagk | 260—567.6 |
| 2,127,476 | 8/38 | Ulrich et al. | 260—567.6 |
| 2,195,194 | 3/40 | Ulrich et al. | 260—567.6 |
| 2,290,154 | 7/42 | Blair | 252—344 |
| 2,290,411 | 7/42 | De Groote et al. | 252—344 |
| 2,290,415 | 7/42 | De Groote et al. | 252—8.55 |
| 2,290,416 | 7/42 | De Groote et al. | 252—8.55 |
| 2,643,979 | 6/53 | Lindert | 252—344 |
| 2,759,975 | 8/56 | Chiddix et al. | 252—344 |
| 3,004,924 | 10/61 | Kirkpatrick et al. | 252—344 |

JULIUS GRRENWALD, *Primary Examiner.*